(12) United States Patent
Grubb et al.

(10) Patent No.: US 11,914,537 B2
(45) Date of Patent: Feb. 27, 2024

(54) TECHNIQUES FOR LOAD BALANCING WITH A HUB DEVICE AND MULTIPLE ENDPOINTS

(71) Applicant: Apple Inc., Cupertino, CA (US)

(72) Inventors: Jared S. Grubb, San Francisco, CA (US); Robert M. Stewart, San Jose, CA (US); Gabriel Sanchez, San Jose, CA (US); Zaka ur Rehman Ashraf, Pleasanton, CA (US); David J. Chandler, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/718,984

(22) Filed: Apr. 12, 2022

(65) Prior Publication Data

US 2022/0334992 A1 Oct. 20, 2022

Related U.S. Application Data

(60) Provisional application No. 63/175,478, filed on Apr. 15, 2021.

(51) Int. Cl.
  *G06F 13/38* (2006.01)
  *G06F 13/40* (2006.01)
  *G06F 11/30* (2006.01)
  *G06F 11/34* (2006.01)

(52) U.S. Cl.
  CPC ........ *G06F 13/385* (2013.01); *G06F 11/3041* (2013.01); *G06F 11/3055* (2013.01); *G06F 11/3404* (2013.01); *G06F 13/4063* (2013.01)

(58) Field of Classification Search
  CPC ............... G06F 13/385; G06F 13/4063; G06F 11/3041; G06F 11/3055; G06F 11/3404
  See application file for complete search history.

(56) References Cited

U.S. PATENT DOCUMENTS

| 2006/0031612 A1* | 2/2006 | Bashford | G06F 13/385 710/74 |
| 2015/0195357 A1* | 7/2015 | More | H04L 67/1097 709/224 |
| 2017/0160952 A1* | 6/2017 | Nakanishi | G06F 12/1408 |

(Continued)

FOREIGN PATENT DOCUMENTS

WO 2019231537 A1 12/2019

OTHER PUBLICATIONS

Application No. PCT/US2022/024531, International Search Report and Written Opinion, dated Jul. 18, 2022, 16 pages.

*Primary Examiner* — Henry Tsai
*Assistant Examiner* — Aurangzeb Hassan
(74) *Attorney, Agent, or Firm* — Kilpatrick Townsend & Stockton LLP

(57) ABSTRACT

Techniques are disclosed for managing the connection assignments of a plurality of accessory devices to one or more hub devices. In one example, a user device acting as a leader device receives an assignment request from an accessory device. The user device may obtain information corresponding to hub attributes from the one or more hub devices. The user device may also obtain accessory traits from the accessory device. The user device can compare the accessory traits with the hub attributes to determine a connection score for each hub device. The user device can then assign the accessory device to the hub device with the highest connection score.

20 Claims, 9 Drawing Sheets

(56) References Cited

U.S. PATENT DOCUMENTS

2019/0081810 A1\* 3/2019 Jung .................. H04L 12/2827
2019/0213156 A1\* 7/2019 Goyal ................. G06F 11/3409
2020/0051558 A1 2/2020 Yeon et al.

\* cited by examiner

TECHNIQUES FOR LOAD BALANCING WITH A HUB DEVICE AND MULTIPLE ENDPOINTS

CROSS-REFERENCES TO RELATED APPLICATIONS

This application claims priority under 35 U.S.C. § 119(e) to: U.S. Provisional Application No. 63/175,478, filed on Apr. 15, 2021, the contents of which are herein incorporated by reference.

BACKGROUND

Techniques exist for multiple devices in a home environment to communicate among the multiple devices. For example, a user can interact with a device that provides a digital assistant program. This device, via the digital assistant, can communicate with other devices to perform requests from the user, including controlling smart accessory devices such as light switches, speakers, and thermostats. However, controlling smart device functionality has continued challenges. A collection of accessory devices may require a leader device to manage the associations between the accessory devices and a collection of hub devices. Accessory devices and hub devices can have many different features and capabilities. Accessory devices may also be produced by various manufacturers. However, various challenges exist with managing these accessory devices.

BRIEF SUMMARY

Embodiments of the present disclosure can provide methods, systems, and computer-readable media for providing load balancing management between accessory devices and hub devices. In some examples, a user device can act as a leader device to assign accessory devices to hub devices and provide information corresponding to the assignments.

According to one embodiment, a method may be executed by a computer system within a home environment. The computer system can be a user device such as a smartphone, a tablet, a smart television (TV) media streaming device, a smart hub speaker, or the like. The user device may receive an assignment request from an accessory device present within the home environment. The user device can then select a hub device within the home environment to connect to the accessory device. The selection can be based on a determination of which hub device is the best hub device to connect to the accessory.

In some embodiments, the user device can receive information from the accessory device identifying accessory traits that correspond to features or functionality of the accessory. The user device can also receive information from one or more hub devices within the home environment. The hub information can correspond to attributes of each hub, including each hub's features and capabilities. The hub information can also include a number of accessory connection slots available at the hub devices. The user device may then score the hub devices by comparing the accessory traits with the hub attributes to obtain a score corresponding to the suitability of the hubs to connect with the accessory device. The score can then be multiplied by the number of available accessory slots at each hub to obtain a final connection score. The hub with the highest connection score can be assigned to the accessory.

In another embodiment, a hub device can update its available connection slots due to changes at the hub device, including increased processing load at the hub device. The updated slots may result in a currently assigned accessory being dropped from the hub device. The dropped accessory can then request a new assignment from the leader device.

In another embodiment, a user device acting as a leader device can receive information that it is no longer suitable to act as the leader device. This information can be a determination made by the user device based upon its own current attributes, including that the user device is experiencing a higher processing load and can no longer effectively manage hub devices. The user device can transmit a request to a server device to select another user device to act as the leader device. The server device can then select a second user device to be the leader device. The server device can then instruct the second user device to assume management control over the hub devices and accessory devices. The first user device can then transmit current hub information and accessory assignment information to the second user device.

In some embodiments, a user device acting as a leader device can obtain information about the current processing capabilities of a first hub device. This information can indicate that the first hub device is not able to respond to an accessory assigned to the first hub device within a threshold amount of time. The user device can then obtain hub information from other hub devices and compare that hub information to the accessory traits of the accessory currently associated with the first hub device to obtain connection scores. The user device can then instruct the first hub device to drop the accessory device and instruct the highest scoring other hub device to connect to the accessory device.

DETAILED DESCRIPTION OF THE EMBODIMENTS

Figure 1:
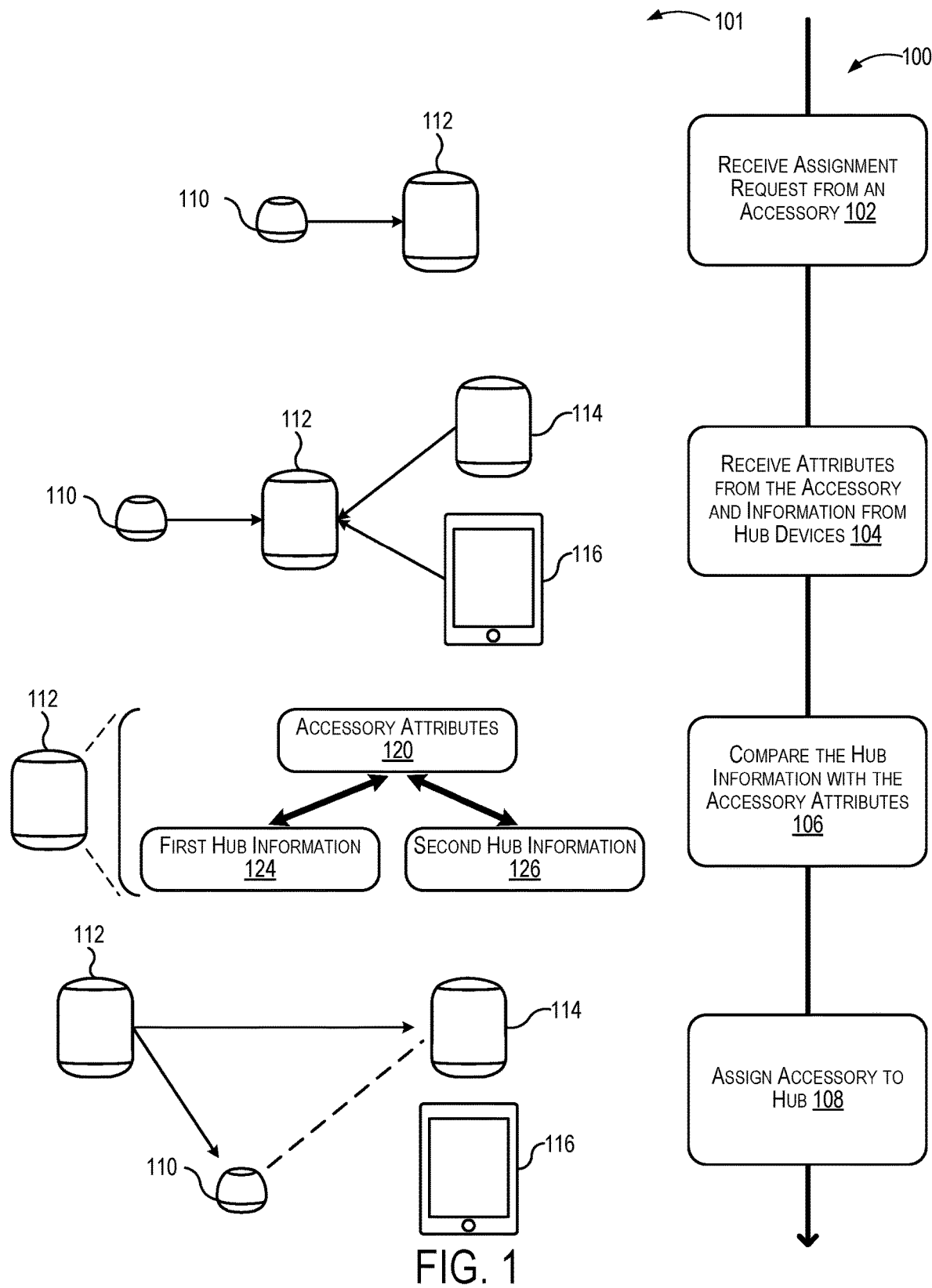
FIG. 1 is a simplified block diagram of an example method, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for managing the associations of accessory devices and hub devices. As a first example, consider a home environment corresponding to a home. A person within the home may want to know the current time. The person may query an accessory device (e.g., a nearby smart speaker) within the home environment with a verbal request (e.g., "What time is it?"). The accessory device can determine that the request was intended for the device and then transmit the received audio information to a hub device (e.g., a hub speaker). The hub device can process the audio information to determine the nature of the request and prepare a corresponding response (e.g., "It is 10:30 p.m."). Alternatively, or partly in combination with the above, the user device may transmit some or all of the verbal request to a server computer (e.g., implementing a service provider), where the service provider can determine the nature of the request and/or prepare a corresponding response. The hub device can then transmit the response back to the accessory device for playback to the user. To provide coordination between the accessory device and the hub device, a user device can be configured to assign the accessory device to that particular hub device. The user device can monitor the hub device and other hub devices in the home environment and reassign the accessory device to another hub device if the other hub device would be more suitable for processing user requests or other interactions with the accessory. Additionally, the user device may be configured to assign a newly added accessory device to one of the hub devices based at least in part on various factors (e.g., accessory capabilities, hub capabilities, etc.).

As an illustration of the example above, the home environment can include numerous "smart" devices, e.g., electronic devices with features allowing them to operate, to some extent, interactively and autonomously. The smart devices (which can have various functionality) can be cameras, speakers, thermostats, headphones and headsets, phones, or media players. The smart devices can also have various network communication capabilities, including WiFi, Ethernet, Bluetooth, Zigbee, cellular, and the like. The devices can be produced by various manufacturers. In some instances, the smart devices may be categorized into hub devices and accessory devices. A hub device can be a resident device of the home (e.g., a smart speaker, a smart digital media player configured to control a television (TV), a mobile phone, etc.). While not always, in some examples, a resident device may be expected to reside within the home and not move (e.g., within the home or to outside of the home) often. A hub device can have capabilities equal to or exceeding the capabilities of an accessory device. For example, a hub device can be a mobile phone, which can include wireless (e.g., WiFi) and cellular communications capabilities, multimedia capabilities, and a device assistant. In this same example, an accessory device can be a smart speaker, which can include audio media and wireless communications capabilities but lack a device assistant. A device assistant can be a virtual assistant program configured to interact with a user. In these examples, depending on its capabilities, a smart speaker can be either a hub device or an accessory device. In some examples, if an accessory is manufactured by an entity different from the entity that manufactured the user devices, the accessory may not initially be configured with the ability to communicate with the user devices. In some instances, the user device manufacturer may provide an accessory development kit ("ADK") for installation on the accessory that enables such communication either after the accessory is manufactured, sold, provisioned, or used. A user device can be a hub device as described herein, and may include user interface features. In some embodiments, the user device is a leader device selected from among the hub devices in the home environment. As used herein, the terms hub device, user device, and leader device can indicate one or more similar devices distinguished from the accessory devices.

In some embodiments, the user device can obtain information about the accessory devices and hub devices present in the home environment. This information can be obtained by the user device communicating directly with accessory devices and hub devices sharing the same network within the home environment. In other embodiments, information about accessory devices and hub devices can be sent to the user device by a second user device, a leader device, or a remote server device. For example, a user in the home may add a new accessory device to the home environment. As part of this process, the user can interact with a second user device (e.g., a mobile phone) to configure the new accessory device and send the new accessory device information to the first user device. As another example, a leader device in the home environment can have information about a plurality of accessory devices and hub devices in the home environment and report information about some or all of these devices to the user device. The user device can then use the information to assign the accessory device to a suitable hub device. The accessory information and hub device information may be stored by the user device.

The information received by the user device from the hub devices and accessory devices can correspond to traits, attributes, or capabilities of the hub devices and accessory devices. For example, a hub device can be a hub speaker with a microphone input, a speaker output, and a device assistant with support for multiple spoken languages. The hub speaker's attributes would then identify that the hub speaker could receive audio input (through the microphone), produce audio outputs (through the speaker), and process user requests (through the device assistant). Moreover, the hub speaker could have, as an attribute, support for multiple language processing, such that the hub speaker could be able to process user requests in a variety of spoken languages. Continuing the example, an accessory device can be a smart thermostat with a touch screen, a microphone input, no speaker output, and a connection to a furnace in the home environment. The smart thermostat's attributes would then identify that the thermostat can interact with a user at the touch screen, present visual information or other indications to the user at the touch screen, receive audio inputs, be incapable of producing audio outputs, and operate the furnace to control ambient environmental conditions in the home. However, one of ordinary skill would understand that is merely one example, and that most if not all accessories will have a speaker for output. In some embodiments, the attribute information can also include information corresponding to the computational capabilities of the devices, including the current processing load of the device. In addition, each hub device can have a finite number of connection slots corresponding to the maximum number of associated accessories that the hub device can support. Each accessory associated with the hub occupies one slot, leaving unoccupied slots available for association with other accessories. The attribute information can also include the network communications capabilities of the devices. Any particular capability or functionality of the devices may be an identifiable attribute, and many combinations of capabilities and device functions are contemplated and described in several examples herein.

Once the user device has received attribute information from the hub devices and the accessory device, the user device can score the hub devices to determine which hub device is the "best" hub device to associate with the accessory device. The score can be based on whether the accessory device requires particular attributes of a hub device. For instance, a camera accessory may require that any hub device that it is to associate with possess a hardware video decoder such that any hub that does not have the required decoder would receive a low score or a zero score from the user device. As another example, an accessory smart speaker may require specific language support from any hub device with which it is associated. One hub device may implement that language support partially, while a second hub device may implement that language support with high quality assets. The first hub may receive a low score while the second hub may receive a higher score with respect to being the best hub to associate with the smart speaker.

In some embodiments, the hub devices can receive a base score that corresponds to their general computing power. For example, a tablet or smartphone hub device may have a higher base score than a hub speaker due to its more substantial computational capabilities. However, in other examples, a smartphone hub device may have a lower base score because of ephemeral nature (e.g., the smartphone may move around in the home and/or leave the home more often than other devices). Ephemeral devices may not make the best hubs because when they move, they may drop the associated accessory devices and force re-associations of those accessory devices to other hubs (which can create latency within the system). The base score can be modified by the comparison of accessory and hub attributes. A final connection score can then be computed by multiplying the modified score by the number of available connection slots at each hub. The hub device with the highest connection score is deemed the best hub device for the accessory, and the user device can transmit information to that best hub device to associate the accessory with it.

FIG. 1 is a simplified block diagram 101 of an example embodiment. The process 100 is an example high-level process flow for a system that includes an accessory device 110 requesting assignment to a hub device via user device 112. The diagram 101 shows states of the system that correspond to the blocks of the process 100. The process 100 can be performed within a home environment containing multiple accessory devices, user devices, and hub devices. As depicted here, the accessory device 110 can be a smart speaker while the user device 112 can be a hub speaker. Although described as being a particular device, it should be apparent that the accessory device 110, the user device 112, or the hub devices 114, 116 can be several types of smart devices in various combinations and number. For example, a smartphone, media device (e.g., a smart TV), or tablet (either connected to a cellular network, to a local area network via WiFi of a home network, or to a wide area network ("WAN")) can perform one or more of the operations of the process 100.

Turning to the process 100 in more detail, at block 102 the user device 112 can receive an assignment request from the accessory device 110. The assignment request can occur when the accessory device 110 recognizes that it is not currently associated with a hub device. For example, the accessory device 110 may be a new accessory device introduced into the home environment. As another example, the hub device previously associated with accessory device 110 may have lost network connection with devices in the home environment, such that accessory device 110 needs to be associated with a new hub device to properly relay user requests or other functions. In other instances, the accessory device 110 may be dropped by its currently associated hub device. This can occur when the currently associated hub device reduces its total number of connection slots, for example due to an increased computational load is instructed to do so by the user device or another device.

At block 104, the user device 112 can receive information from the accessory device 110, a first hub device 114, and a second hub device 116. The information can include attributes 120 from accessory device 110 and attribute information 124, 126 from the hub devices 114, 116. As described in more detail with respect to FIG. 3, below, the accessory attributes 120 can include any feature of the accessory device 110 relevant to its association with a hub device. Some accessory attributes can be classified as requirement attributes. Similarly, the hub information 124, 126 can include any attribute or feature of the hub devices 114, 116 relevant to selecting a best hub device. In some embodiments, the user device 112 can receive hub attribute information 124, 126 upon request. The user device 112 can store the received hub and accessory attribute information. The stored attribute information may be stored locally at the user device or at a remote device like a server computer. In other embodiments, the hub devices 114, 116 can periodically update stored attribute information 124, 126 without a request from the user device 112. For example, the hub devices 114, 116 may update their attribute information stored at a server device each time those attributes change (e.g. if the number of accessory slots decreases) or at a regular interval (e.g. every minute). The user device 112 can then access the stored data to receive hub attribute information 124, 126 without directly querying each hub within the home environment.

Moving down to block 106, the user device 112 can compare the accessory attributes 120 with the first hub information 124 and the second hub information 126. The comparison can result in a score or other metric to determine which of the first hub device 114 and the second hub device 116 should be assigned to accessory device 110. In some embodiments, each of the hub devices 114, 116 can be given a base score corresponding to each device's general computing power. The user device 112 can then modify that base score by combining it with the result of the comparison. A connection score for each hub device is computed by multiplying the modified score by the number of slots available at hub device 114 and hub device 116. The user device 112 can then assign the accessory device 110 to the hub device with the highest connection score, as in block 108.

As an example of the foregoing embodiments, consider the scenario depicted in FIG. 1, where the accessory device 110 is a smart speaker, hub device 114 is a hub speaker, and hub device 116 is a tablet. Because the tablet may have a greater general computing power than a hub speaker, hub device 116 can be assigned a higher base score than the hub device 114. The smart speaker may only require basic language support for one language in the home environment, and both the hub speaker and tablet can provide that support. Thus, when comparing the requirement attributes of accessory device 110 to the hub information 124, 126, each hub receives the same non-zero score. With regard to other accessory features, the tablet can provide both a microphone and a speaker as well as a touch screen, while the hub speaker may only provide a microphone and a speaker. The smart speaker accessory attributes may indicate that a hub device that can present information visually (e.g., via speech to text) is beneficial. All other attributes being equal, the tablet may receive a higher comparison score than the hub speaker. Then, the user device 112 can compute a modified score for the second hub device 116 that is significantly higher than the modified score for the first hub device 114. But the tablet may only have one accessory connection slot that is already occupied by another accessory, while the hub speaker may have two open slots. The user device 112 can then compute the connection score for each hub device, multiplying the hub speaker's modified score by two and the tablet's modified score by zero. The result would be that the hub speaker is the winning device and the user device 112 can assign accessory device 110 to hub device 114 as depicted. The above description should only be considered as one example of the outcome of the disclosed process. One skilled in the art would recognize that a home environment with numerous devices can produce various different outcomes for accessory/hub assignments depending on the dynamic nature of the hub attributes, the available connection slots, and the migration of hub devices and accessory devices into or out of the home networks.

Figure 2:
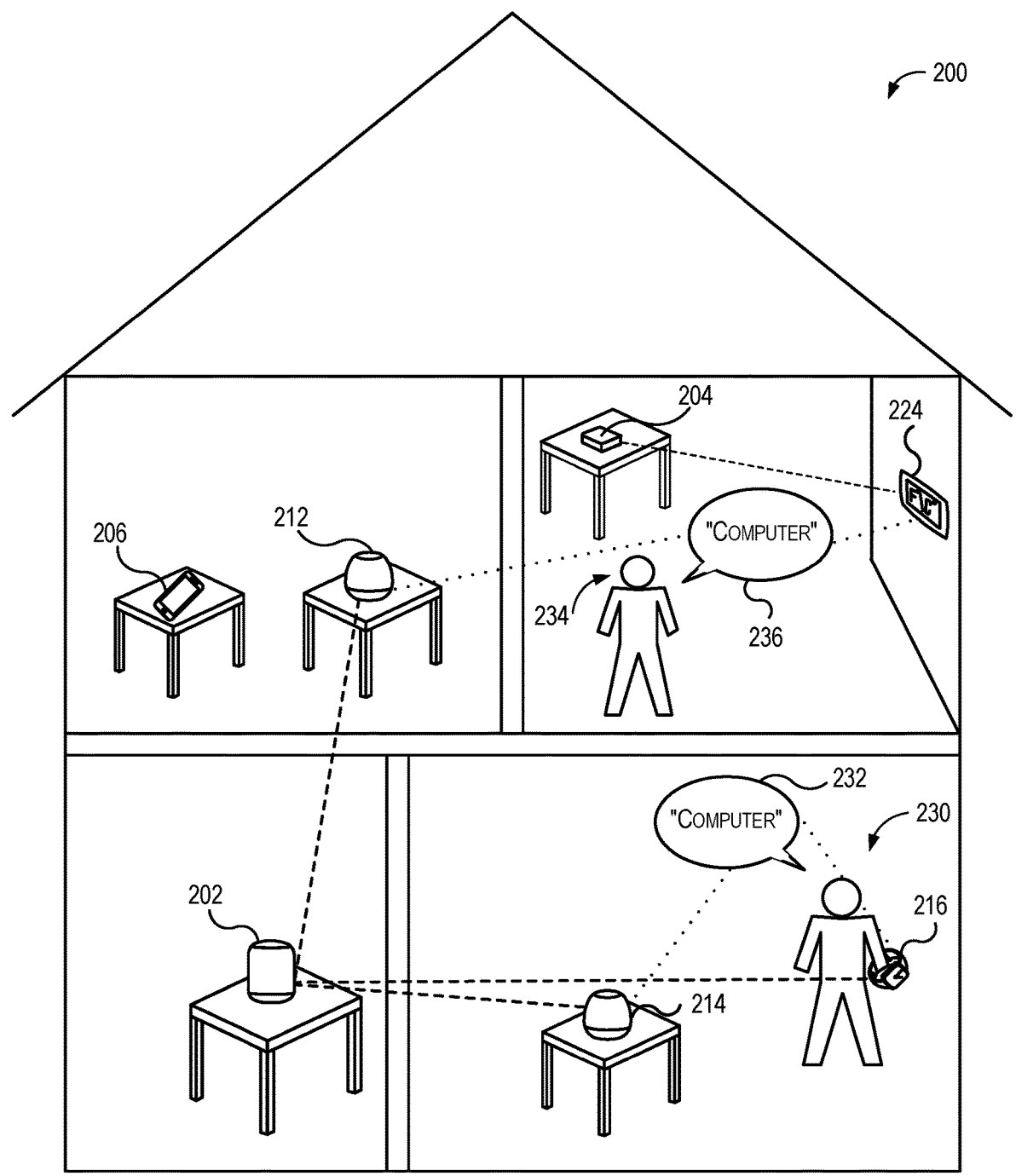
FIG. 2 is a schematic of a home environment containing hub devices and accessory devices, according to some embodiments.

FIG. 2 is a schematic of a home environment 200 containing hub devices and accessory devices, according to some embodiments. Hub devices can include a hub speaker 202, a media player 204, and a smartphone 206. These hub devices can correspond to hub devices 114, 116 from the embodiments described above with respect to FIG. 1. Accessory devices can include smart speakers 212, 214, a smartwatch 216, and a thermostat 224. Similarly, these accessory devices can correspond to accessory device 110 described with respect to FIG. 1. All or some of these accessory devices may be third-party devices (e.g., not manufactured, programmed, or provisioned by the manufacturer, programmer, or provisioner of the hub devices or user devices). Because of this, they may not be automatically and/or initially compatible with the user devices. Each hub device in the home environment 200 can be associated with zero, one, or more accessory devices. As illustrated by the long-dashed lines, hub speaker 202 is associated with smart speakers 212, 214 and smartwatch 216 while media player 204 is associated with thermostat 224. The smartphone 206 is not associated with an accessory device. The devices within the home environment 200 can be configured to communicate using one or more network protocols over one or more networks associated with the home environment 200. For example, the home environment 200 can be associated with a local area network ("LAN"), a WAN, a cellular network, a personal area network, or other network, and the devices can communicate using a WiFi connection, a Bluetooth connection, a Thread connection, a Zigbee connection, or other communication method.

The arrangement of associations of accessory devices with hub devices can include various different combinations and can be modified by a user device. For example, a user device may receive an assignment request from an accessory device within the home environment. The accessory device can be one of the accessory devices previously associated with a hub device in the home or can be a new accessory device added to the home. The user device would then obtain attribute information from the accessory device and the hub speaker 202, media player 204, and smartphone 206 and then score these hub devices. Because the smartphone 206 is not currently associated with an accessory device, it may have the highest score and receive the assignment of the new accessory. In some embodiments, a user device in the home environment 200 can communicate with a hub device to transfer one or more accessory devices associated with the first hub device to the second hub device. This transfer can occur automatically based on information that the user device receives about the home environment 200, including, but not limited to, information that another hub device may be more suitable for association with one or more accessories or that accessories have been added to or removed from the home environment 200. The suitability of any particular hub device to associate with an accessory can be based at least in part on the capabilities of the hub device, the capabilities of the accessory device, the current processing load experienced by the hub device, the locations of the devices within the home environment, and the status of communications between the devices on a network. Many other criteria for rearranging device associations in a home environment are contemplated.

In some embodiments, accessory devices and non-resident hub devices may also leave the home environment or lose network connectivity with the home environment. An accessory device that leaves the home environment can be disassociated by the previously associated hub device, such that the hub device updates its accessory slots to account for a newly available slot. Accessory devices associated with a hub device that loses network connectivity with the home environment can be reassigned by a user device that retains network connectivity. In this case, the user device can receive information that the hub device is no longer able to communicate with the accessory device and reassign the accessory device. Some embodiments may have a user device designated a leader device to manage the assignment of accessory devices among the hub devices within the home environment. In other embodiments, if user devices and accessory devices are associated and leave the home environment and lose network connectivity, the user devices can retain their associations with the accessory devices and perform the embodied methods described herein.

In another embodiment, a user device acting as a leader device can monitor the hub devices within the home environment to determine whether each hub device can respond to its accessories in an acceptable timeframe. In some circumstances, a hub device may come under increased processing load, making it unable to respond to one or more of its assigned accessories within a threshold amount of time. The user device can receive information about the hub device indicating its delayed response to accessory requests and instruct the hub device to drop one or more of its accessory devices. The user device can then determine which other hubs within the home environment should be assigned the dropped accessory devices.

Returning to FIG. 2, as an example of the foregoing description of some embodiments, the hub speaker 202 can drop its association with smartwatch 216. This can occur due to an increased processing load occurring at hub speaker 202, for instance if it is currently streaming separate music channels to smart speakers 212, 214. Because it has no associated hub, the smartwatch 216 can request assignment from a user device, which can be smartphone 206. Smartphone 206 can then receive attribute information from the hub devices in the home environment 200. This can include attribute information about smartphone 206 itself, since user devices can act similarly to hub devices, in some embodiments. Smartwatch 216 would then score each hub device based on the comparison of attribute information and the accessory attributes. Since hub speaker 202 recently dropped the accessory smartwatch 216 due to increased demands, the hub speaker can reduce its total number of accessory connection slots and have no slots available. The smartphone 206 could then determine the winning hub device between itself and the media player 204 and assign the smartwatch 216 appropriately.

Continuing with FIG. 2, a home environment 200 can have multiple users 230, 234 making audio requests 232, 236 of accessories. The requests 232, 236 can occur separately or simultaneously and can be received by multiple accessory devices as depicted by the short-dashed lines. For example, request 232 can be received by smart speaker 214 or smartwatch 216, while request 236 can be received by smart speaker 212 and thermostat 224. As described previously, the arrangement of accessory devices and their associations can take various forms and can change over time. Thus, a user request may be received by multiple accessory devices associated with different hub devices. For example, user request 236 is received by both thermostat 224 associated with media player 204 and by smart speaker 212 associated with hub speaker 202. Since user interactions with the devices in the home environment 200 can occur in several arrangements, the ability for a user device or leader device to assign accessories to the best hub device can prevent user requests from being missed. If an accessory device is dropped by its hub device, as described in a previous example, or if a hub device loses network connectivity, the accessory devices may not be able to process user requests unless they are quickly reassigned to the best available hub device.

Hub device management by a user device or leader device can also allow hub devices to receive and process audio requests 232, 236 that require a response at one or more accessory devices other than the accessory device initially receiving the request. In these embodiments, the accessory devices may have no information about other accessories within the home environment and no mechanism to establish trust or permissions with other accessories on one or more of the networks of the home. For example, the smart thermostat 224 and smartwatch 216 can be third party accessories manufactured by two different entities, and thus may have no inherent ability or permissions to connect directly to one another to communicate or exchange data and information. A user device can manage the assignments of accessories to hub devices so that each hub can establish a connection with each of its accessories and transmit information received from other hubs to those accessories without the accessories knowing about any other device in the home environment except for its assigned hub.

As a specific example of the foregoing embodiments, consider the case where user 234 wants to make an announcement to user 230 to remember to buy milk at the grocery store as user 230 is about to leave the home. The user request 236 may be heard more clearly by smart thermostat 224 assigned to media player 204 because user 234 is in the same room with thermostat 224. Upon processing the user request, media player 204 can transmit the response to hub speaker 202 and smartphone 206 (e.g., the other known hub devices in the home environment). The announcement can be played at every capable device within the home, including smartphone 206, hub speaker 202, smart speakers 212, 214, and smartwatch 216 to ensure that it is heard by user 230. The announcement can also be selectively transmitted by hub speaker 202 to smartwatch 216 so that it is presented by the most appropriate device. In this way, a user request can be received at one third party device (the thermostat) and executed at a second third party device (the smartwatch) without either third party device directly communicating with the other. Consider a further example where user 230 collects smartphone 206 and leaves the home environment before user 234 makes the announcement request. Since the smartwatch 216 has left the home environment, it may lose network connectivity with hub speaker 202. When it does so, the smartwatch 216 can request assignment to another hub device. The smartphone 206 or other user device can assign the smartwatch 216 to another suitable hub device, which can be the smartphone 206 since it remains in close proximity to the smartwatch 216. Smartphone 206 can also retain network connectivity with the home environment via its cellular network connection to an Internet WAN. When user 234 makes the announcement to bring back milk from the grocery store, the request can again be processed by media player 204 and transmitted to hub speaker 202 and smartphone 206 for playback. Since hub speaker 202 is no longer assigned to smartwatch 216, it will take no further action executing the announcement request. Smartphone 206 can receive the announcement and transmit it to its accessory smartwatch 216 for audio playback to user 230.

Figure 3:
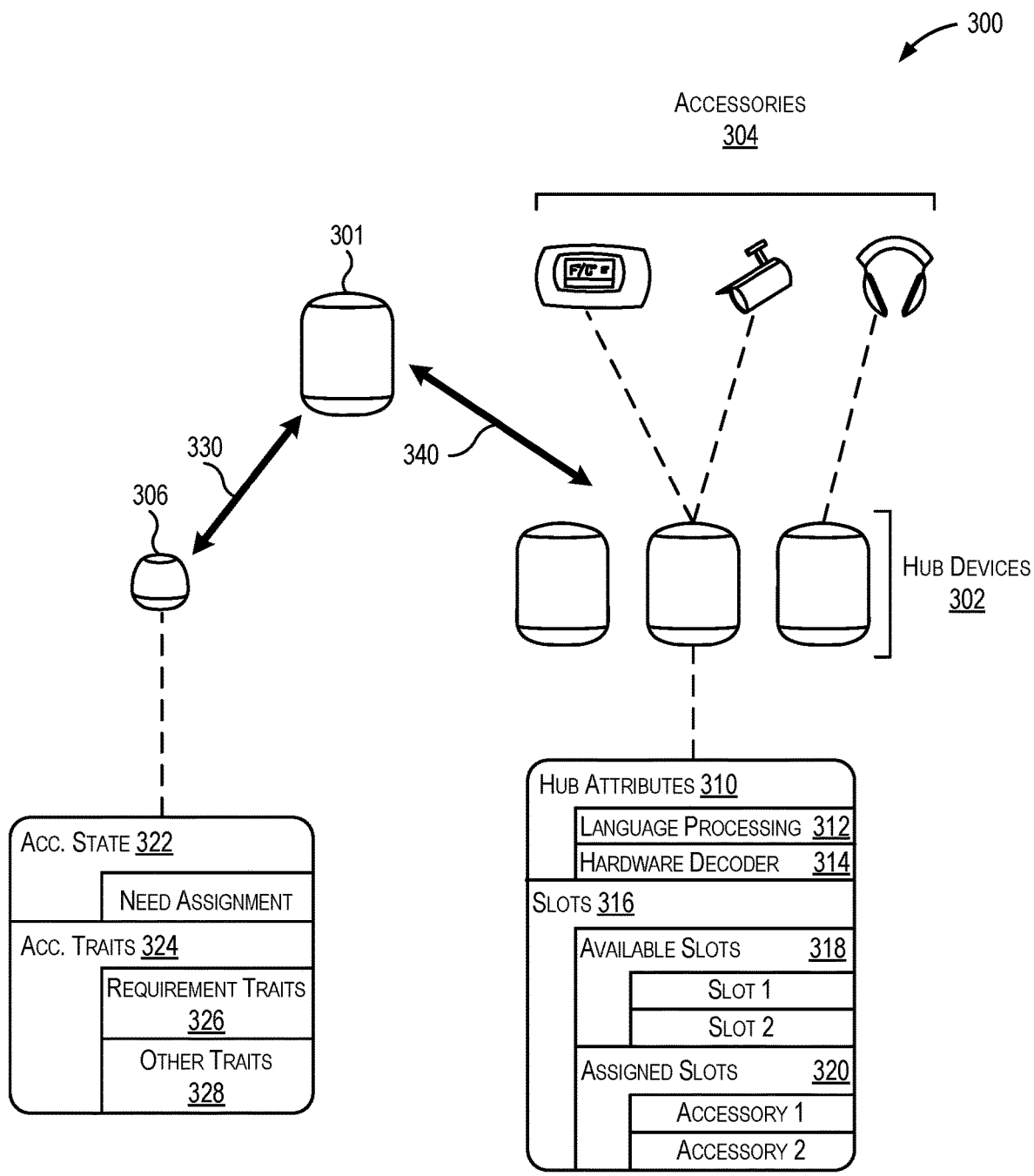
FIG. 3 is another simplified block diagram illustrating at least some methods of managing the associations between accessory devices and hub devices, according to some embodiments.

FIG. 3 is a schematic illustrating a process 300 for a user device 301 to assign an accessory device 306 to one of the hub devices 302. In some embodiments, the user device 301 can correspond to user devices described herein (e.g., user device 112 of FIG. 1). Similarly, accessories 304 and accessory device 306 may correspond to other accessory devices and hub devices 302 may correspond to other similar hub devices described herein. User device 301, depicted here to be a hub speaker, can be a hub device among the hub devices 302, a leader device, a configuration device, or other device used to determine device assignments and associations. The user device 301 can be configured to communicate with the hub devices 302, accessories 304, and accessory device 306 over one or more networks described herein, including a LAN or a WAN. In some embodiments, the user device 301 is a remote server device configured to communicate with the hub devices 302, accessories 304, and accessory device 306 over a WAN.

Multiple elements of the assignment process 300 are presented in more detail. The hub devices 302 can each comprise hub attribute information including hub attributes 310 and slots 316. This information may be stored in a memory or storage unit at the hub device. In some embodiments, the hub information can be stored at a remote device like a server computer or cloud device. In other embodiments, the hub information is stored at the user device 301 and updated periodically. The hub attributes 310 can include any attribute or feature of the hub devices 302 relevant to selecting a best hub device. This can include language processing 312, hardware decoder 314, supported network connections (e.g. WiFi, cellular, or Thread), ability to act as an edge router for a personal area network (e.g., Thread border router), and the types of other accessories currently associated with the hub device. The slots 316 can include both the number of available accessory connection slots 318 and the number of currently assigned slots 320. The number of total slots 316 is a dynamic quantity and may be changed or updated by the hub device according to changing circumstances in the home environment. Changes to the number total slots 316 can result in an assigned accessory being removed from the hub device if the hub device no longer has enough slots 316 available to support the accessory. In some embodiments, if the number of slots 316 becomes fewer than the number of assigned accessories, accessories that are assigned to the hub based on a matching requirement trait 326 are disassociated from the hub only if no other accessory devices can be disassociated first. As depicted here, an exemplary hub device can have four total slots, with two slots available and two slots assigned to "Accessory 1," a thermostat, and "Accessory 2," a camera.

Accessory device 306 can be a representative accessory from among the accessories 304 and can comprise information corresponding to the accessory state 322 and the accessory traits 324. As used herein, the terms accessory traits and accessory attributes can be used interchangeably. The accessory state 322 is a piece of information corresponding to whether the accessory 306 is currently assigned to a hub. If it is assigned then the accessory state 322 will identify the assigned hub. If the accessory is not assigned (e.g., it is a new accessory to the home environment), then the accessory state 322 can indicate that the accessory 306 needs assignment, instructing the accessory to request assignment from the user device 301. In some embodiments, an accessory device can be unassigned to a hub and not request a hub assignment. In these cases, the unassigned accessory can transmit its state information to the user device 301 but not request an assignment to a hub device. The accessory traits 324 can include any feature of the accessory device 306 relevant to its association with a hub device, including, but not limited to, language support requirements, hardware encoding/decoding requirements, the input/output ("I/O") devices present (e.g., speaker and microphone or a screen), the type of network connections supported (e.g., WiFi and Bluetooth), and external device control (e.g., control of a light switch or a home furnace). Some accessory attributes can be classified as requirement attributes.

Completing the detailed elements of FIG. 3, process indicators 330, 340 represent data transmission between the accessory user device 301 and the accessory device 306 and between the user device 301 and the hub devices 302, respectively. The process indicators 330, 340 can indicate communication over one or more networks between the various devices as described herein, including, but not limited to, a WiFi LAN or an Internet WAN. Process indicator 330 indicates transmission of data corresponding to the request for assignment and the accessory traits 324 to the user device 301. This data can include that the accessory device 306 is no longer in communication with its assigned hub device. Similarly, process indicator 340 indicates transmission of data including hub attributes 310 and slots 316 between the hub devices 302 and the user device 301.

The process 300 provides a more detailed picture of the scoring process described above with respect to block 104 of FIG. 1. Once user device 301 has received accessory traits 324 and hub attributes 310 and slots 316 from the hub devices 302, it can score the hub devices 302 to determine the best hub. The scoring begins by determining a base score for each hub device. Then, user device 301 can compare accessory traits 324 with hub attributes 310. The comparison begins by comparing the requirement traits 326 of the accessory device 306 with the hub attributes 310. Since the accessory device 306 has indicated that these attributes are required in some manner, if the comparison does not match a requirement trait 326 with a corresponding attribute 310 of the hub device, then the resulting score for that hub device will be zero. This zero result will occur regardless of how well the hub device scores with respect to other attributes of the accessory device 306. In some instances a hub device may only partially match a requirement trait 326 (e.g., by providing a required feature at low quality). The user device 301 may give a non-zero score to the hub device for the partial fulfillment of the requirement. Once the requirement traits 326 are compared, the user device 301 then compares the other accessory traits 328 to each feature in the hub attributes 310. The result is then combined with the base score to obtain a modified score. The connection score for each hub device can be computed by multiplying the modified score by the number of slots available at each of the hub devices 302.

Figure 4:
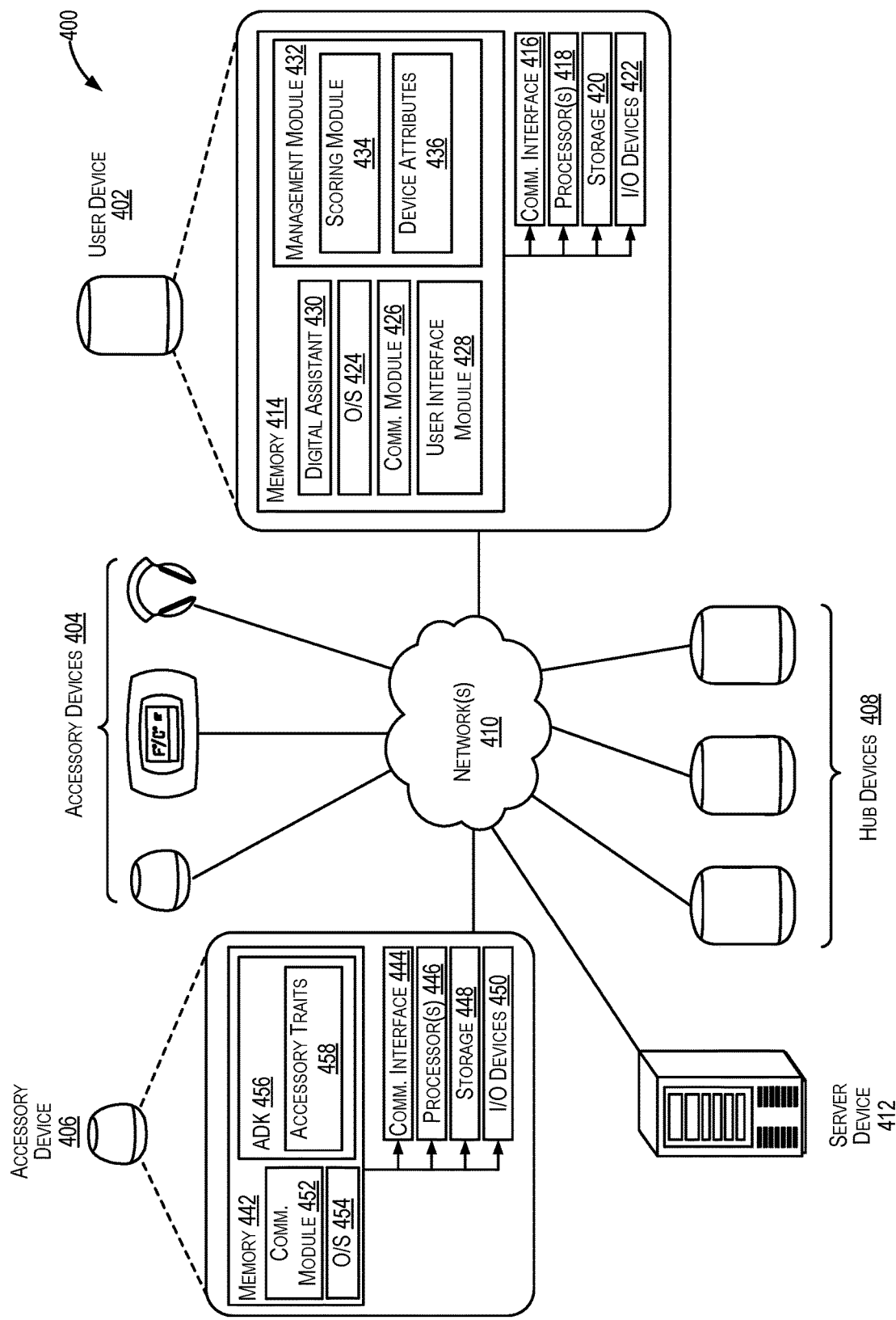
FIG. 4 is a simplified block diagram illustrating an example architecture of a system used to detect and act upon a user request, according to some embodiments.

FIG. 4 is a simplified block diagram 400 illustrating an example architecture of a system used assign an accessory device to a hub device, according to some embodiments. The diagram includes a user device 402 (e.g., a leader device), one or more accessory devices 404, a representative accessory device 406, one or more network(s) 410, and a server device 412. In some examples, the user device 402 may be one of a plurality of hub devices that may have been elected as a leader of hub devices). Each of these elements depicted in FIG. 4 may be similar to one or more elements depicted in other figures described herein. In some embodiments, at least some elements of diagram 400 may operate within the context of a home environment (e.g. the home environment 200 of FIG. 2).

The accessory devices 404 and representative accessory device 406 may be any suitable computing device (e.g., smart speaker, smartwatch, smart thermostat, camera, etc.). In some embodiments, an accessory device may perform any one or more of the operations of accessory devices described herein. Depending on the type of accessory device and/or location of the accessory device (e.g., within the home environment or outside the home environment), the accessory device may be enabled to communicate using one or more network protocols (e.g., a Bluetooth connection, a Thread connection, a Zigbee connection, a WiFi connection, etc.) and network paths over the network(s) 410 (e.g., including a LAN or WAN), described further herein.

In some embodiments, the server device 412 may be a computer system that comprises at least one memory, one or more processing units (or processor(s)), a storage unit, a communication device, and an I/O device. In some embodiments, the server device 412 may perform any one or more of the operations of server devices described herein. In some embodiments, these elements may be implemented similarly (or differently) than as described in reference to similar elements of user device 402.

In some embodiments, the user device 402 may correspond to any one or more of the user devices described herein. For example, the user device 402 may correspond to one or more of the user devices of the home environment 200 of FIG. 2. The representative user device may be any suitable computing device (e.g., a mobile phone, tablet, a smart hub speaker device, a smart media player communicatively connected to a TV, etc.). Similarly, the hub devices 408 can be any device capable of performing the functions of a user device.

In some embodiments the one or more network(s) 410 may include an Internet WAN and a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa. In some embodiments, the server device 412 may be external to the home environment, and thus communicate with other devices over the WAN.

As described herein, user device 402 may be representative of one or more user devices connected to one or more of the network(s) 410. The user device 402 has at least one memory 414, a communications interface 416, one or more processing units (or processor(s)) 418, a storage unit 420, and one or more input/output (I/O) device(s) 422.

Turning to each element of user device 402 in further detail, the processor(s) 418 may be implemented as appropriate in hardware, computer-executable instructions, firmware or combinations thereof. Computer-executable instruction or firmware implementations of the processor(s) 418 may include computer-executable or machine executable instructions written in any suitable programming language to perform the various functions described.

The memory 414 may store program instructions that are loadable and executable on the processor(s) 418, as well as data generated during the execution of these programs. Depending on the configuration and type of user device 402, the memory 414 may be volatile (such as random access memory ("RAM")) or non-volatile (such as read-only memory ("ROM"), flash memory, etc.). In some implementations, the memory 414 may include multiple different types of memory, such as static random access memory ("SRAM"), dynamic random access memory ("DRAM") or ROM. The user device 402 may also include additional storage 420, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 420 may be utilized to store data contents received from one or more other devices (e.g., server device 412, other user devices, hub devices 408, accessory devices 404, or the representative accessory device 406). For example, the storage 420 may store accessory management settings, accessory attributes, hub attribute information, and user data associated with users affiliated with the home environment.

The user device 402 may also contain the communications interface 416 that allows the user device 402 to communicate with a stored database, another computing device or server, user terminals, or other devices on the network(s) 410. The user device 402 may also include I/O device(s) 422, such as for enabling connection with a keyboard, a mouse, a pen, a voice input device, a touch input device, a display, speakers, a printer, etc.

The memory 414 may include an operating system 424 and one or more application programs or services for implementing the features disclosed herein, including a communications module 426, a user interface module 428, a digital assistant 430, and a management module 432. The management module 432 further comprises a scoring module 434 and device attributes 436.

The communications module 426 may comprise code that causes the processor(s) 418 to generate instructions and messages, transmit data, or otherwise communicate with other entities. For example, the communications module 426 may, in conjunction with management module 432, transmit and receive data associated with accessory assignment requests, accessory traits, and hub device attributes from accessory devices 404, 406, the hub devices 408, other user devices, or the server device 412. As described herein, the communications module 426 may transmit messages via one or more network paths of network(s) 410 (e.g., via a LAN associated with the home environment or an Internet WAN).

The user interface module 428 may comprise code that causes the processor(s) 418 to present information corresponding to the accessory devices 404 and hub devices 408 present within a home environment. For example, the user interface module 428 can present a graphical representation of hub devices 408 and the accessory devices 404 currently associated with each hub device. In some embodiments, the user interface module 428 can allow a user to provide configuration information about a new accessory device to be added to a home environment or allow the user to select hub devices 408 or accessory devices 404 for removal from the home environment.

The digital assistant 430 may comprise code that causes the processor(s) 418 to receive and process user requests. The user requests may be transmitted to the user device from accessory devices 404. The digital assistant 430 can comprise speech processing capabilities and language support. The presence of a digital assistant 430 and features therein can comprise one or more of the attributes considered when comparing accessory traits 458 to hub attributes to score the hub devices 408.

The management module 432 may comprise code that causes the processor(s) 418 to send and receive information to and from one or more accessory devices 404, 406 and to and from one or more hub devices 408 or other user devices. For example, the management module 432 may, in conjunction with the communications module 426, receive an assignment request and accessory traits from accessory device 406 or receive hub attributes from the hub devices 408. The management module 432 may also transmit information to the accessory device 406 and one of the hub devices 408 indicating an assignment to the best hub. In some embodiments, the management module 432 may store information corresponding to the accessory state of each accessory managed by the user device 402 within the home environment. The accessory state can identify to which hub of a plurality of hub devices 408 each accessory device of the plurality of accessory devices 404 is assigned.

The management module 432 can include scoring module 434 and device attributes 436. The device attributes 436 can include accessory traits 458 received from accessory device 406 and hub attributes received from the hub devices 408. The device attributes 436 may be stored in memory 414 or the storage 420 at the user device. In some embodiments, the device attributes can be stored at another device, including the server device 412, and received into memory 414 when user device 402 processes an assignment request. The scoring module 434 can comprise code that causes the processor(s) 418 to compare the accessory traits and hub attributes comprising the device attributes 436 to compute a score for each of the hub devices 408.

Turning now to the details of the representative accessory device 406, the accessory device 406 can have, in some embodiments, at least one memory 442, a communications interface 444, processor(s) 446, a storage unit 448, and I/O devices 450. As described herein with respect to the user device 402, these elements of the accessory device can have the same appropriate hardware implementations as their counterparts on the user device 402.

The memory 442 of the accessory device 406 can include an operating system 454 and one or more application programs or services for implementing the features disclosed herein, including communications module 452 and an accessory development kit ("ADK") 456. The ADK can be a software development kit ("SDK") stored and configured to be executed or processed on the accessory device 406. As used herein, an SDK can include application programming interfaces and related software libraries sufficient to enable the operation of other software within or associated with the SDK. In some embodiments, the ADK can be provided by an entity associated with the hub devices 408 or the user device 402 (e.g., their manufacturer). As described herein with respect to the user device 402, the communications module 452 can have similar appropriate functionality as its counterpart communications module 426.

The ADK 456 may comprise code that causes the processor(s) 446 to determine the assignment state of the accessory device 406 and, if the accessory device 406 is not currently assigned to a hub device, transmit an assignment request to the user device 402. The ADK 456 can comprise the accessory traits, including requirement traits and other traits of the accessory device 406. In some embodiments, the accessory traits may be similar to those described in reference to accessory traits 324 of FIG. 3. For example, accessory device 406 may require a particular language support of any of the hub devices 408 to which it is assigned.

Figure 5:
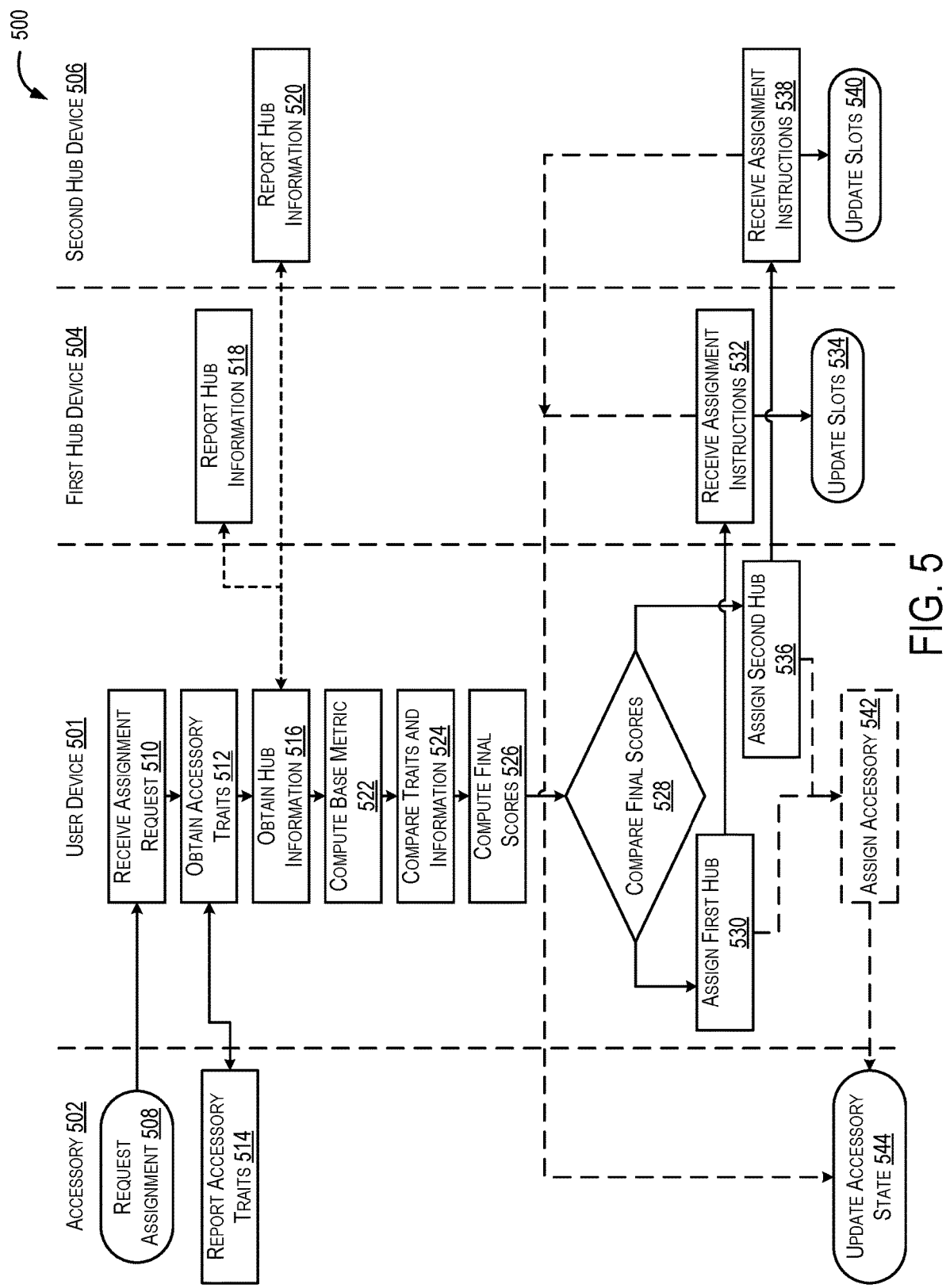
FIG. 5 is a flow diagram illustrating an example process for assigning an accessory device to a selected hub device, according to an embodiment.

FIG. 5 is a flow diagram illustrating a particular example process 500 for assigning an accessory 502 to a selected hub device. Each of the elements and operations depicted in FIG. 5 may be similar to one or more elements depicted in other figures described herein. For example, the user device 501 may be similar to other user devices (e.g., leader devices), and so forth. In some embodiments, process 500 may be performed within a home environment (e.g. the home environment 200 of FIG. 2). Process 500, as well as processes 600, 700, 800, and 900 of FIGS. 6, 7, 8, and 9 (described below) are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 508, the accessory 502 can request assignment to a hub device. The request can be initiated based on the accessory device recognizing that it is currently unassigned to a hub device. This can be due to the accessory device being new to the home environment or the previously assigned hub device dropping the accessory device. At block 510, the user device 501 can receive the assignment request. In some embodiments, the user device 501 can be a leader hub device among the hub devices in the home environment. The leader hub device can be chosen as a leader by another process, including a process that occurs at a server device or other device that determines leadership among the hub devices.

At block 512, the user device 501 can obtain accessory traits reported by the accessory 502 at block 514. The accessory traits may be similar to accessory traits 324 described with reference to FIG. 3. In some embodiments, the user device 501 can query the accessory 502 to obtain those traits. In other embodiments, the accessory device transmits the accessory traits along with the assignment request. In still other embodiments, the accessory 502 can periodically report its accessory traits to a leader device (or one or more other devices (including other leader devices)) or server device such that the leader device, other devices, or server device maintains an up-to-date store of the accessory traits. Similarly, at block 516, the user device 501 can obtain hub information from one or more hub devices. The hub information may be similar to the hub attributes 310 and slots 316 described in detail above with respect to FIG. 3.

In some examples, controller devices may have hub capabilities enabled or disabled, such that only devices with the hub capabilities enabled can act as a hub for accessory 502. Similarly, or alternatively, the devices may have a digital and/or virtual assistant enabled or disabled, which may be used to determine whether the device can act as a hub. The user device 501 may maintain a list of all devices that have hub capabilities (or assistant capabilities) enabled. Thus, when the user device 501 obtains the hub information at block 516, it may only query devices (e.g., first hub device 504 and second hub device 506) because those devices are already listed as hub-enabled or assistant-enabled. Alternatively, the hub information may have already been obtained from the hub devices when the user device 501 was updated with information identifying the hub-enabled or assistant-enabled devices (e.g., when it learns which devices have hub and/or assistant capabilities enabled, the user device 501 may obtain each devices hub information at the same time). Additionally, in some examples, block 516 may actually be performed when the user device 501 becomes a leader and, thus, is configured to poll all other devices in the mesh about their capabilities. As noted above, it may be at this point, when the user device 501 obtains hub information, as opposed to obtaining the information in response to accessory 502 requesting assignment at block 508. In which case, at block 516, the user device 501 may obtain the hub information by retrieving it from its own memory, as it would have presumably already received it from the first hub device 504 and/or the second hub device 506 upon creation of the mesh or when the user device 501 becomes the leader. In some examples, the hub devices may periodically update their respective hub information (e.g., as features are added/removed). When this occurs, the user device 501 may need to obtain updated hub information from each of the first hub device 504 and second hub device 506.

As depicted in FIG. 5, the hub devices can comprise a first hub device 504 and a second hub device 506. Process 500 is not limited to only two hub devices and may be performed for any number of hub devices in the home environment. As with receiving the accessory traits, in some embodiments the user device 501 can query the hub devices 504, 506 to report hub information at block 518 and block 520. The hub devices 504, 506 may also periodically report hub information to the user device 501 or a server device to maintain an up-to-date store of hub information. In these embodiments, the user device 501 may receive the hub information by accessing the repository of hub information stored at itself or a server device.

At block 522, the user device 501 can compute a base metric for the first hub device 504 and the second hub device 506. This base metric can be based upon the general computing capabilities of the hub devices 504, 506. For example, the first hub device 504 can be a tablet computer with a powerful processor and substantial on-board memory while the second hub device 506 can be a hub speaker with a less powerful processor and memory. The base score for the tablet computer can be higher than for the hub speaker. The base score can also depend on the current processing load experienced by a hub device. In the previous example, although a tablet computer may have greater computational capabilities than a hub speaker, the tablet may be in continual use performing other computational tasks for users in the home environment (e.g., running applications or playing media). Thus, the computed base score can be different for the same hub device depending on the current processing capabilities of the hub device when the score is determined.

At block 524, the user device 501 can compare the received accessory traits to the received hub information from the first hub device 504 and the second hub device 506. In some embodiments, one or more of the operations of block 524 may be similar to one or more of the operations described for block 106 of FIG. 1 or process 300 in reference to FIG. 3. For example, the accessory 502 can have requirement traits and other traits. The hub information can identify features and functionality of the hub devices 504, 506 that can meet the requirements of the accessory requirement traits. The user device 501 can compare the requirement traits to the attributes of the first hub device 504 and the second hub device 506 and compute a modified score for each hub device. The modified score is a modification of the base score using the results of the comparison. Hub devices that cannot meet the requirement traits of the accessory device are given a modified score of zero.

Many methods of quantifying the comparison of accessory traits to hub attributes are contemplated, and the scoring algorithm used by the user device 501 can be updated or modified over time to provide different quantifications of the best hub device score. Consider, for example, a home environment wherein the hub devices frequently encounter significant loading due to activity unrelated to the interaction between the hub devices and accessory devices. This loading can be due to many of the hub devices receiving user interaction to perform other tasks, like a tablet computer or media player streaming video content from the Internet. In these cases, the hub devices may frequently indicate that they cannot support their assigned accessories, which can result in frequent reassignments of the accessories. Connection stability among the assigned accessory devices and the hub devices may be improved by altering the scoring algorithm such that hub devices with attributes indicating that the hub device may come under frequent loading will receive a lower score.

Returning to process 500, at block 526 the user device 501 can compute final scores for the first hub device 504 and the second hub device 506. The final scores can be a first connection score for the first hub device 504 and a second connection score for the second hub device 506. The final scores are computed by multiplying the modified scores obtained at block 524 by each hub device's available connection slots. If a hub device has no available slots, its final score can be zero. Similarly, if a hub device received a modified score of zero because it did not meet the requirements of the accessory traits, its final score can also be zero, regardless of the number of available slots the hub device has or its general computing power.

At decision 528, the final scores from the hub devices 504, 506 are compared and the highest score wins, indicating the best hub device for the accessory assignment. If the first hub device 504 has the higher connection score, the process moves to block 530 and the user device 501 assigns accessory 502 to the first hub device 504. The assignment can include the first hub device 504 receiving assignment instructions identifying the accessory 502 and allowing the first hub device to associate with the accessory 502. The association can include, for example, creating an interaction instance comprising software modules for communicating with the accessory 502 and processing user requests transmitted from the accessory 502 to the first hub device 504. The association may also include the first hub device 504 establishing a connection with the accessory 502. At endpoint 534, the first hub device 504 can update its slots to reflect one fewer available connection slots owing to the newly associated accessory 502. Conversely, if the second hub device 506 has a higher connection score, the process can move to block 536 and the user device 501 can assign accessory 502 to the second hub device 506. Block 538 and endpoint 540 are similar to block 532 and endpoint 534, but with operations performed by the second hub device 506. For example, upon receipt of the assignment instructions at block 538, the second hub device may associate itself with the accessory 502 (e.g., establishing a connection with the accessory 502). In some examples, when the accessory 502 is first connected to the network (e.g., the same network to which each of user device 501, first hub device 504, and second hub device 506 are connected), the accessory 502 may provide its information (e.g., an identifier, etc.), and thus each device on the network will be aware of the device and how to connect to it. In this way, once the first hub device 504 or the second hub device 506 are assigned to be the hub for the accessory 502, they are already configured to connect.

Once the best hub device has been determined and assigned, the process can move to block 542 to assign the accessory 502 to the best hub device. Assignment of the accessory 502 can include transmitting information to the accessory 502 identifying which of the first hub device 504 and the second hub device 506 received the higher connection score. At endpoint 544, the accessory 502 can update its accessory state to reflect the current hub assignment.

However, in some instances, block 542 is skipped, and the user device 501 does not report any information about hub assignments back the accessory 502. In that case, at endpoint 544, the accessory 502 may instead update its accessory state based on being contacted by (and/or connecting with) either one of first hub device 504 or second hub device 506 as desired (e.g., as described above).

Figure 6:
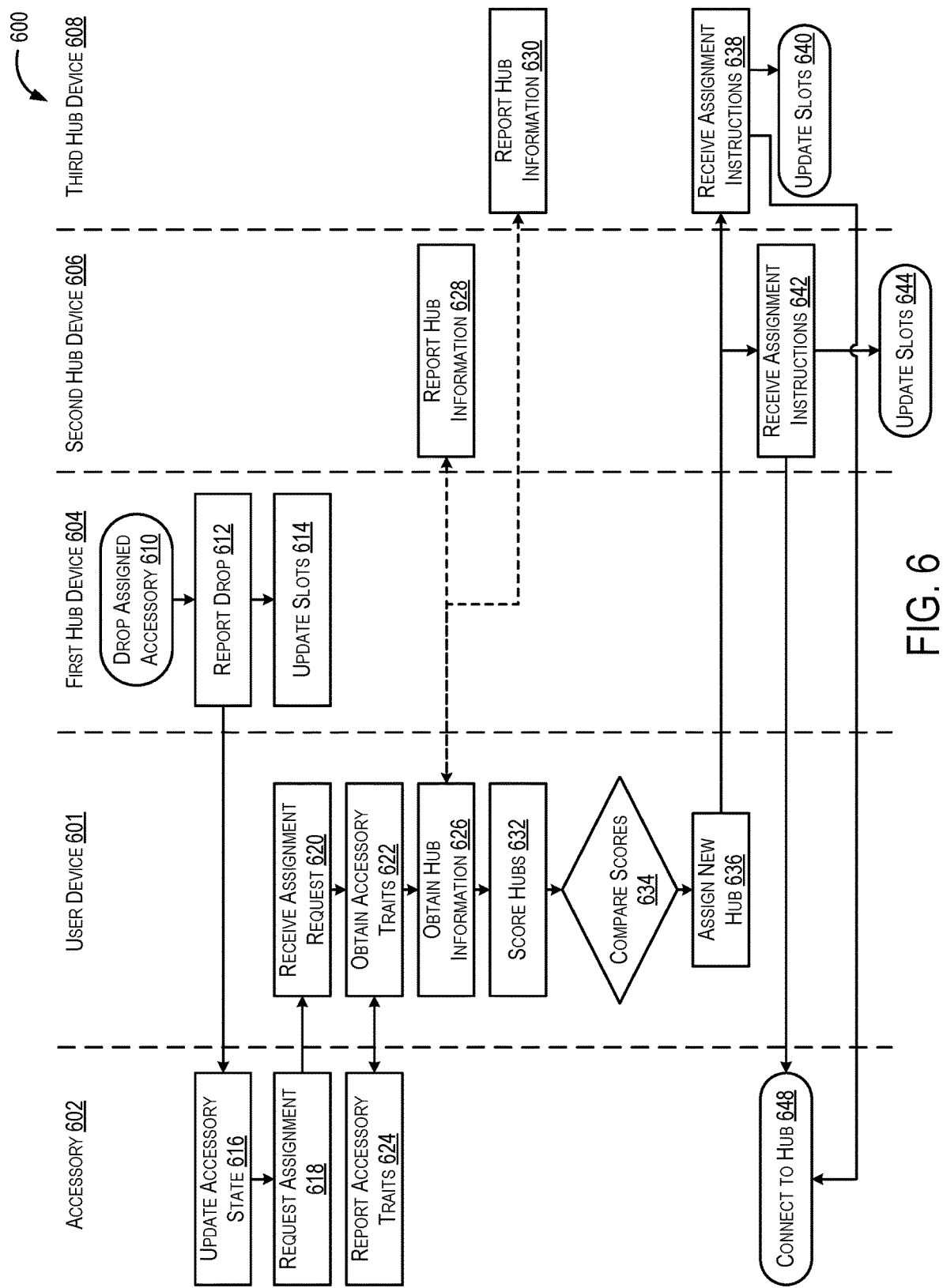
FIG. 6 is another flow diagram illustrating an example process for reassigning an accessory device from one hub device to another hub device, according to an embodiment.

FIG. 6 is another flow diagram illustrating an example process 600 for reassigning an accessory device from one hub device to another hub device, according to an embodiment. Each of the elements and operations depicted in FIG. 6 may be similar to one or more elements depicted in other figures described herein. For example, the user device 601 may be similar to other user devices (e.g., a leader device), while the first, second, and third hub devices 604, 606, 608 may be similar to other hub devices, and so forth. As with the process 500 described previously, in some embodiments, process 600 may be performed within a home environment (e.g. the home environment 200 of FIG. 2) or within any type of network environment (e.g., office network, school network, generic network, etc.).

At block 610, the first hub device 604 can drop a currently assigned accessory 602 (e.g., ending a session with the accessory 602 by closing the socket or the like), for instance because the first hub device 604 begins to experience an increased processing load due to other activity at the first hub device 604. At block 612, the first hub device 604 can indicate to the accessory 602 that it has been dropped and disassociated. The first hub device can then update its slot information to reflect that accessory 602 is no longer associated. In some embodiments, the first hub device 604 can update its slot information in response to an increased processing load before reporting to the accessory 602 that it is being dropped. In these embodiments, the operations of blocks 610, 612, and 614 can occur in different orders than depicted in the diagram of process 600. The slot information can be similar to the slots 316 described in detail with respect to FIG. 3.

At block 616, upon receiving information from the first hub device 604 that it is being dropped, the accessory 602 can update its state to reflect that it is no longer assigned to the first hub device. At block 618, the accessory can request assignment from the user device 601. Blocks 620-626 may comprise one or more operations that are similar to blocks 510-516 of FIG. 5. At block 626, the user device 601 can receive a second hub information from the second hub device 606 and a third hub information from the third hub device 608. The second hub device 606 can report hub information at block 628, while the third hub device 608 can report hub information at block 630. In some embodiments, although not depicted in FIG. 6, the user device 601 may also obtain a first hub information from the first hub device 604 and a hub information corresponding to its own attributes. In these embodiments, the first hub device 604 may not have reported updated hub information to the user device 601, leaving the user device 601 unaware that the first hub device 604 recently dropped accessory 602 and would likely lose the subsequent scoring process among the hub devices. Such embodiments can represent instances wherein the scoring algorithm and communication between the hub devices and the user device 601 are more efficient if the user device 601 is agnostic to the particular cause for the accessory 602 to make an assignment request.

At block 632, the user device 601 scores the hubs based on the received accessory traits and hub information. Blocks 632-636 may comprise one or more operations that are similar to blocks 522-536 of FIG. 5. At block 636, the user device 601 can assign the accessory 602 to either the second hub device 606 or the third hub device 608 according to their connection scores. If the second hub device 606 has the higher connection score, it can receive assignment instructions at block 642, update its slots accordingly at endpoint 644, and connect to the accessory device 602 at endpoint 648. Similarly, if the third hub device 608 has the higher connection score, it can receive assignment instructions at block 638, update its slots at endpoint 640, and connect to the accessory 602 at endpoint 648. The operations at endpoints 644, 640, and/or 648 can be performed in any order. In other words, the second hub device 606 can connect to the accessory 602 at endpoint 648 before or after it updates its slot information at endpoint 644, and the same is true for endpoints 648 and 640.

As with several previous blocks, one or more of the operations of block 646 and endpoint 648 may be similar to one or more operations of block 542 and endpoint 544 as described with respect to FIG. 5.

Figure 7:
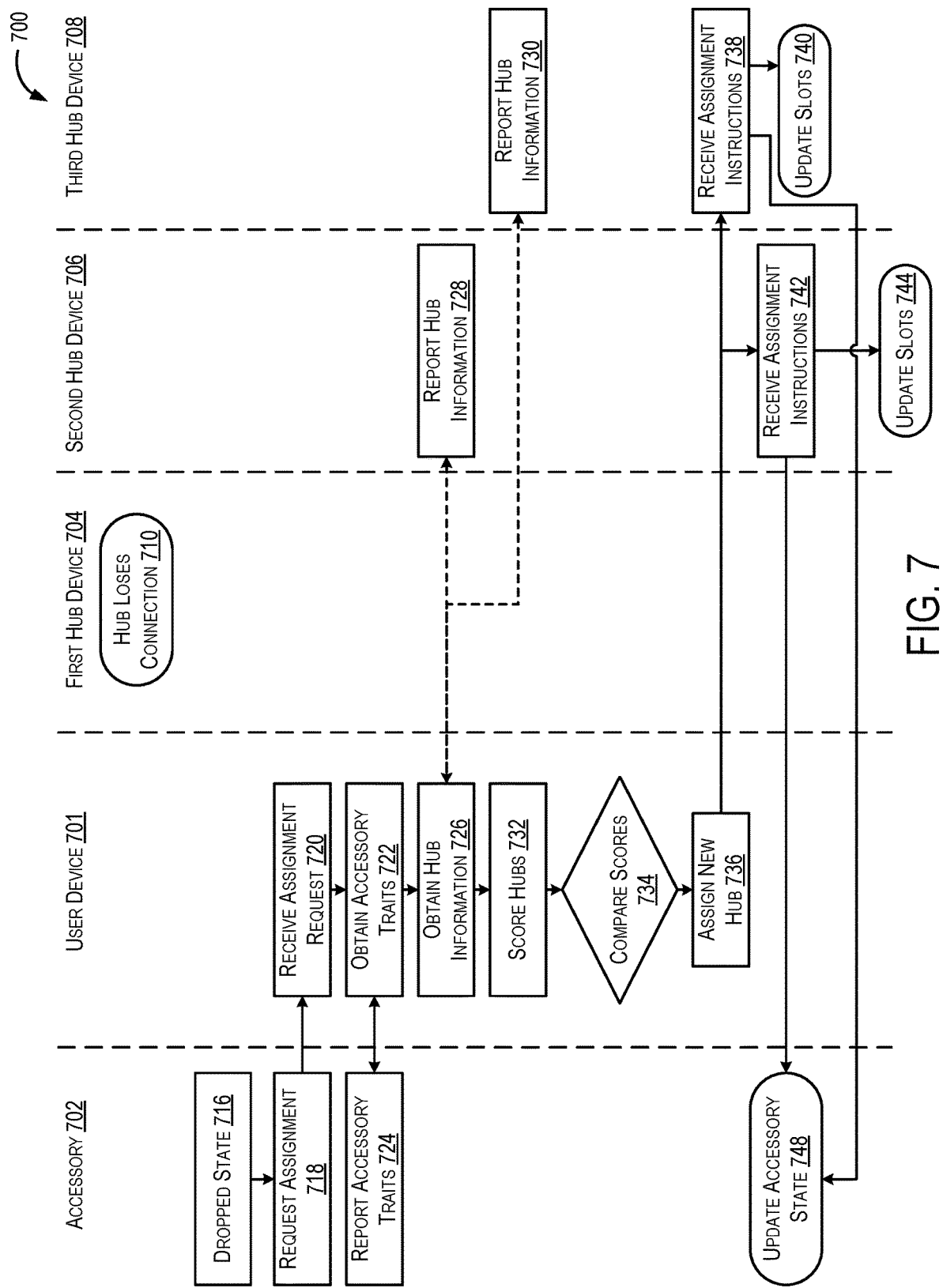
FIG. 7 is another flow diagram illustrating an example process for reassigning an accessory device from one hub device to another hub device, according to an embodiment.

FIG. 7 is another flow diagram illustrating an example process 700 for reassigning an accessory device from one hub device to another hub device, according to an embodiment. Each of the elements and operations depicted in FIG. 7 may be similar to one or more elements depicted in other figures described herein. For example, the user device 701 may be similar to other user devices (e.g., a leader device), while the first, second, and third hub devices 704, 706, 708 may be similar to other hub devices, and so forth. As with the process 500 described previously, in some embodiments, process 700 may be performed within a home environment (e.g. the home environment 200 of FIG. 2) or within any type of network environment (e.g., office network, school network, generic network, etc.).

At block 710, the first hub device 704 can lose connectivity to the network or lose a connection with the accessory 702, for instance because the first hub device is turned off or moved. In some examples, a hub device (e.g., first hub device 704) acting as a hub for an accessory (e.g., accessory 702) may be configured to ping the accessory every so often (e.g., every 15-30 seconds or the like), informing the accessory that it is still acting as the hub. If the accessory 702 does not detect the ping within a threshold period of time, then the accessory device 702 can enter a dropped state at block 716. The ping may be a "keep alive" message that is sent to each connected accessory. In some examples, the "keep alive" message may be a request from the first hub device 704 to read a "ping" characteristic of the accessory 702. When the accessory device 702 detects that the first hub device 704 has read the "ping" characteristic, detection of that reading of the "ping" characteristic informs the accessory 702 that the first hub device 704 is still acting as the hub and the session is still active. Alternatively, instead of the hub devices sending "ping" messages to accessories (and reading accessory characteristics), in some cases, the accessory devices may be configured to initiate pings to their assigned hubs, to validate the connection to each assigned hub. If an accessory pings its respective hub, and is unable to validate the connection, the accessory device 702 can enter the dropped state at block 716.

In some examples, the accessory 702 may stay in the dropped state at block 716 for a period of time (e.g., a "grace period") before requesting a new hub. If the first device 704 comes back online and attempts to the connect (e.g., establish a new socket and/or session) with the accessory 702, then the accessory 702 can reassign to the first hub device 704 (e.g., reconnect to the first hub device 704) without needing to request a new hub from the leader (e.g., the user device 701). However, if the grace period expires, the accessory 702 will instead transition to block 718, where the accessory 702 will request assignment of a new hub from the leader (e.g., the user device 701).

Blocks 720-726 may comprise one or more operations that are similar to blocks 510-516 of FIG. 5 or blocks 620-626 of FIG. 6. At block 726, the user device 701 can receive a second hub information from the second hub device 706 and a third hub information from the third hub device 708. The second hub device 706 can report hub information at block 728, while the third hub device 708 can report hub information at block 730. In some embodiments, although not depicted in FIG. 7, the user device 701 may also obtain a first hub information from the first hub device 704 and a hub information corresponding to its own attributes. In these embodiments, the first hub device 704 may not have reported updated hub information to the user device 701, leaving the user device 701 unaware that the first hub device 704 recently dropped accessory 702 and would likely lose the subsequent scoring process among the hub devices. Such embodiments can represent instances wherein the scoring algorithm and communication between the hub devices and the user device 701 are more efficient if the user device 701 is agnostic to the particular cause for the accessory 702 to make an assignment request.

At block 732, the user device 701 scores the hubs based on the received accessory traits and hub information. Blocks 732-636 may comprise one or more operations that are similar to blocks 522-536 of FIG. 5. At block 736, the user device 701 can assign the accessory 702 to either the second hub device 706 or the third hub device 708 according to their connection scores. If the second hub device 706 has the higher connection score, it can receive assignment instructions at block 742, update its slots accordingly at endpoint 744, and connect to the accessory device 702 at endpoint 748. Similarly, if the third hub device 708 has the higher connection score, it can receive assignment instructions at block 738, update its slots at endpoint 740, and connect to the accessory 702 at endpoint 748. The operations at endpoints 744, 740, and/or 748 can be performed in any order. In other words, the second hub device 706 can connect to the accessory 702 at endpoint 748 before or after it updates its slot information at endpoint 744, and the same is true for endpoints 748 and 740.

As with several previous blocks, one or more of the operations of block 746 and endpoint 748 may be similar to one or more operations of block 542 and endpoint 544 as described with respect to FIG. 5.

Figure 8:
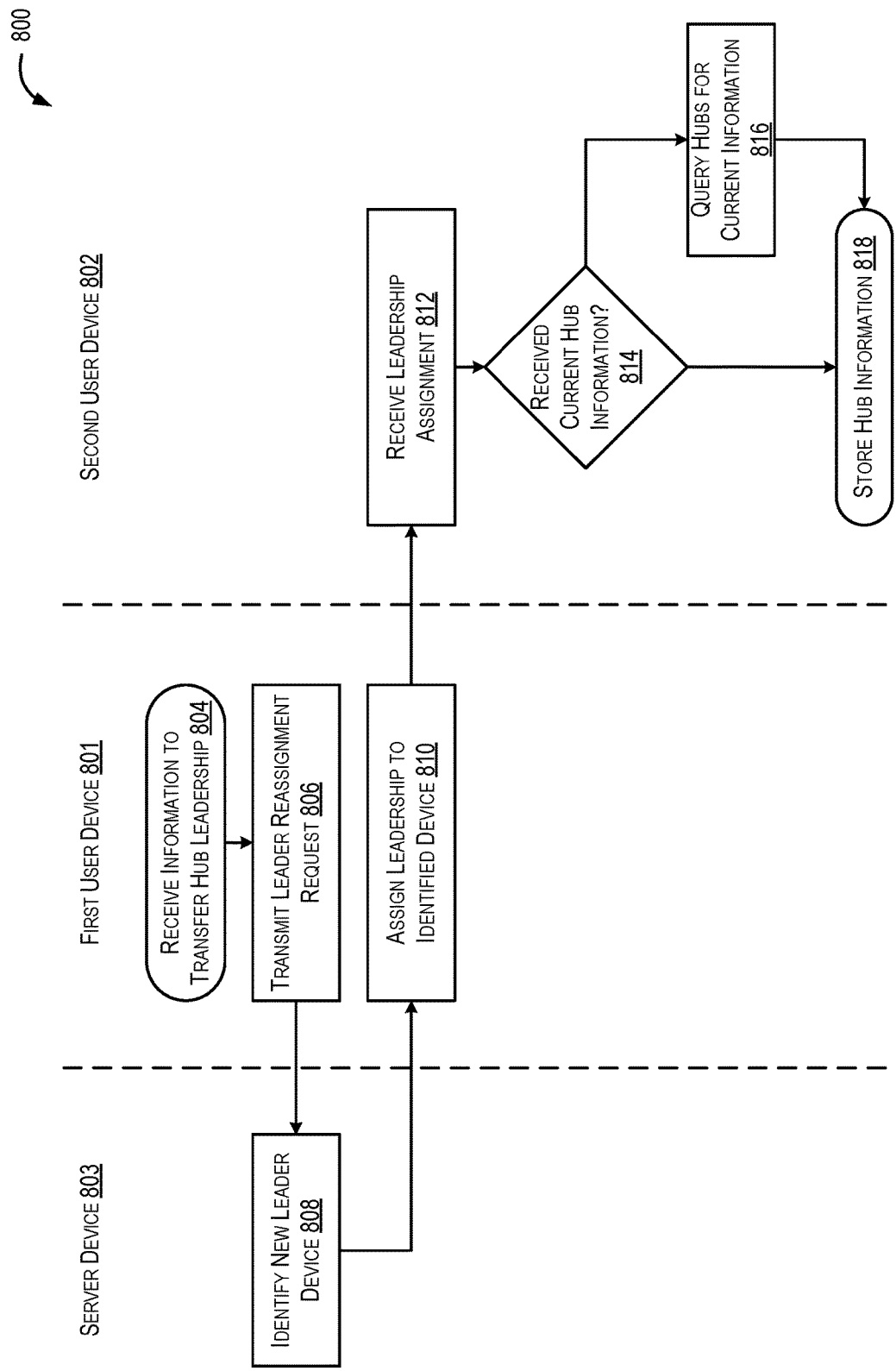
FIG. 8 is another flow diagram illustrating an example process for transferring hub management from one user device to another user device, according to an embodiment.

FIG. 8 illustrates an example process 800 for transferring hub management from one user device to another user device, according to an embodiment. A server device 803 can participate in the transfer of hub management responsibilities from a first user device 801 to a second user device 802. The first user device 801, second user device 802, and server device 803 can correspond to any one or more of the user devices, hub devices, and server devices described herein. In some embodiments, process 800 may be performed within a home environment (e.g., the home environment 200 of FIG. 2).

At block 804, the first user device 801 can receive information or instructions to transfer hub leadership to another hub device within the home environment. In some embodiments, the user device 801 can determine that it is no longer capable of functioning as a leader device for the hub devices in the home environment. For example, the user device 801 can be a tablet computer that is experiencing a significant processing load due to playing streaming media for a user in the home. Upon determining that it is no longer suitable to provide management for the other hub devices, the tablet computer can transmit a request to another device to transfer leadership. In other embodiments, another user device or a server device 803 can instruct the first user device 801 to relinquish its leadership duties. This may happen when a user reconfigures the devices within the home environment and selects a different device to act as a default leader device. The first user device 801 can then transmit a leader reassignment request to the server device 803.

At block 808, the server device 803 can identify a new leader device. This operation is analogous to a user device reassigning an accessory device to another hub device. The server device can select a new leader device based on several criteria including, but not limited to, the processing capabilities of the new leader device, the number of hub devices and accessory devices present within the home, whether the new leader device is a resident device of the home, and whether a user has indicated that a particular device should be the new leader device. In some embodiments, another user device or hub device within the home can perform one or more of the operations of the server device 803, including selecting a new leader device based upon the criteria described above.

Once a suitable device is selected to be the new leader, the first user device 801 can assign leadership to the selected device at block 810. As depicted in FIG. 8, the new leader device can be the second user device 802. As part of the assignment operation, the first user device 801 may send information about hub devices, accessory devices, and the associations between them to the second user device 802. This information can include the current hub attributes and accessory traits. In some embodiments, the first user device 801 only sends an instruction to the second user device 802 to accept leadership duties for the hub devices and accessories in the home environment. In still other embodiments, the server device 803 can communicate directly with the second user device 802 to provide the leadership assignment. For example, in some instances the first user device 801 may lose network connectivity with the other devices in the home environment. The server device, without receiving a leader assignment from the first user device 801, can receive information that the first user device is disconnected from the network and no longer capable of acting as a leader device. The server device 803 can then direct the second user device 802 to assume hub leadership.

At block 812, the second user device 802 receives the leadership assignment. At decision 814, the second user device determines whether it received hub and accessory information from the first user device 801. If it did not, then the process proceeds to block 816 and the second user device can query the hubs for their current hub attributes and accessory assignment information. Once the second user device 802 has the current hub information, it can store it at endpoint 818, either at the second user device or another device.

Figure 9:
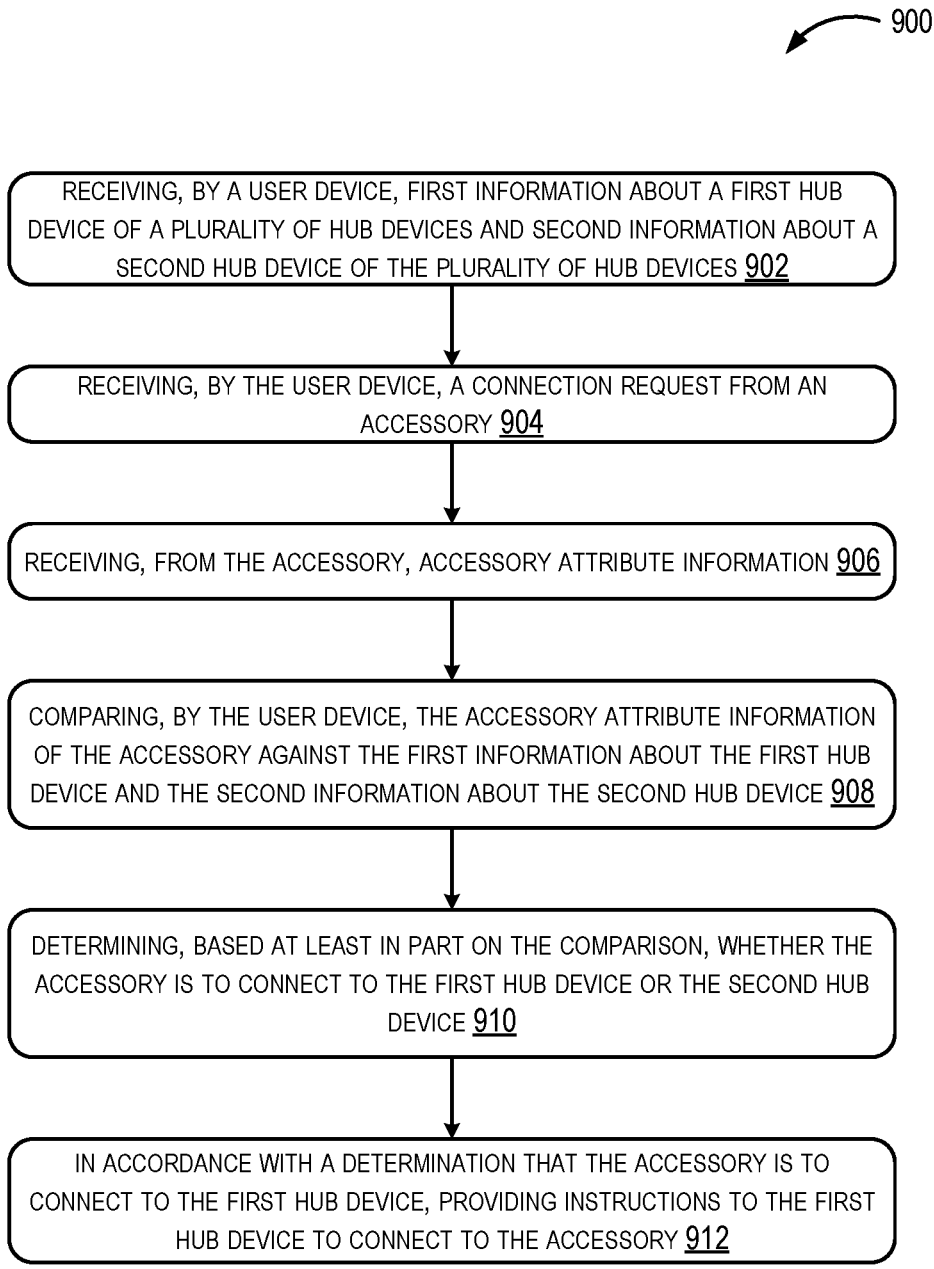
FIG. 9 is a flow diagram showing a process for a user device to assign an accessory device to a selected hub device, according to some embodiments.

FIG. 9 is a flow diagram showing an example process 900 for a user device to assign an accessory device to a selected hub device from among a plurality of hub devices. In some embodiments, one or more of the operations of process 900 may be similar to those as described in reference to FIGS. 1 and 5.

At block 902, a user device may receive a first information about a first hub device and a second information about a second hub device. The first information and second information can correspond to hub attribute information as described herein and may be similar to hub attributes 310 and slots 316 of FIG. 3 and device attributes 436 of FIG. 4. In some embodiments, one or more of the operations of block 902 may be similar to one or more operations described for process indicator 340 in reference to FIG. 3 or block 516 of FIG. 5.

At block 904, the user device can receive a connection request from an accessory. The connection request can be a request to connect to a hub device to which the user device assigns the accessory. In some embodiments, one or more of the operations of block 904 may be similar to one or more operations described for block 512 of FIG. 5.

At block 906, the accessory device can send accessory information to the user device for use in determining the accessory assignment. The accessory information can include information about accessory attributes or traits and requirements of assigned hub devices. In some embodiments, one or more of the operations of block 906 may be similar to one or more operations described for process indicator 330 of FIG. 3 and block 514 of FIG. 5.

At block 908, the user device can determine scores for the first hub device and the second hub device by comparing the accessory attribute information received at block 906 with the first information and the second information received from the first and second hub devices at block 902. In some embodiments, one or more of the operations of block 908 may be similar to one or more operations described for block 524 of FIG. 5.

At block 910, the user device can compare the scores determined at block 908 to determine whether to assign the accessory to the first hub device or the second device. The determination can be based upon which of the hub devices has the higher score. In some embodiments, one or more of the operations of block 910 may be similar to one or more operations described for decision 528 of FIG. 5.

At block 912, the selected hub device can receive instructions to connect to the accessory. In some embodiments, connecting to the accessory can include creating, at the hub device, an accessory interaction instance corresponding to the assigned accessory device. In some embodiments, one or more of the operations of block 902 may be similar to one or more operations described for block 530 of FIG. 5 or block 636 of FIG. 6.

Illustrative techniques for load balancing between a plurality of hub devices and accessories are described above. Some or all of these techniques may, but need not, be implemented at least partially by architectures such as those shown at least in FIGS. 1-9 above. While many of the embodiments are described above with reference to server devices, accessory devices, user devices, and hub devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

Although specific example embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

As described above, one aspect of the present technology is the gathering and use of data available from specific and legitimate sources to improve the delivery to users of invitational content or any other content that may be of interest to them when updating firmware. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, and exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The various embodiments further can be implemented in a wide variety of operating environments, which in some cases can include one or more user computers, computing devices or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory ("EEPROM"), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expect that skilled artisans should be able to employ such variations as appropriate, it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
    receiving, by a user device, first information about a first hub device of a plurality of hub devices configured to transmit various control instructions to an accessory and second information about a second hub device of the plurality of hub devices configured to transmit the various control instructions to the accessory;
    receiving, by the user device, a connection request from the accessory;
    receiving, from the accessory, accessory attribute information;
    comparing, by the user device, the accessory attribute information of the accessory against the first information about the first hub device and the second information about the second hub device, the first information comprising a first number of available connection slots of the first hub device, and the second information comprising a second number of available slots of the second hub device;
    determining, based at least in part on the comparison, whether the accessory is to connect to the first hub device or the second hub device; and
    in accordance with a determination that the accessory is to connect to the first hub device, providing instructions to the first hub device to connect to the accessory.

2. The method of claim 1, wherein the first information about the first hub device comprises at least one of a set of capabilities of the first hub device or a number of available connection slots of the first hub device, and wherein the second information about the second hub device comprises at least one of a set of capabilities of the second hub device or a number of available connection slots of the second hub device.

3. The method of claim 2, wherein comparing the accessory attribute information against the first information about the first hub device and the second information about the second hub device comprises:
    generating a first metric for the accessory potentially connecting to the first hub device based at least in part on the accessory attribute information and the set of capabilities of the first hub device;
    multiplying the first metric times the number of available connection slots of the first hub device to generate a first connection score;
    generating a second metric for the accessory potentially connecting to the second hub device based at least in part on the accessory attribute information and the set of capabilities of the second hub device; and
    multiplying the second metric times the number of available connection slots of the second hub device to generate a second connection score.

4. The method of claim 3, wherein determining whether the accessory is to connect to the first hub device or the second hub device comprises selecting which of the first connection score or the second connection score is higher.

5. The method of claim 1, further comprising:
    receiving, by the user device, hub connectivity information about the first hub device; and
    determining, based at least in part on the hub connectivity information, that the first hub device is no longer connected to the accessory.

6. The method of claim 5, further comprising, in accordance with the determination that the first hub device is no longer connected to the accessory:

comparing, by the user device, the accessory attribute information against the second information about the second hub device and third information about a third hub device;
determining, based at least in part on the comparison, whether the accessory is to connect to the second hub device or the third hub device; and
providing instructions to either the second hub device or the third hub device to connect to the accessory according to the determination.

7. The method of claim 1, further comprising:
receiving, by the user device, information that identifies the user device as a leader hub device configured to manage connections between a plurality of hub devices and a plurality of accessory devices, the first hub device and the second hub device being of the plurality of hub devices, and the accessory being of the plurality of accessory devices.

8. The method of claim 7, wherein the user device is one of the plurality of hub devices.

9. The method of claim 8, further comprising:
determining, by the user device, that the user device is no longer suitable to be the leader hub device; and
in accordance with the determination, assigning hub leader responsibility to another hub device of the plurality of hub devices.

10. The method of claim 9, wherein assigning hub leader responsibility to the another hub device comprises:
transmitting, by the user device, a hub leader reassignment request to a server device configured to provide second information that identifies a second user device as the leader hub device.

11. The method of claim 1, further comprising:
receiving, by the user device, hub processor usage information about the first hub device; and
determining, based at least in part on the hub processor usage information, that the first hub device is no longer capable of responding to the accessory within a threshold amount of time.

12. The method of claim 11, further comprising, in accordance with the determination that the first hub device is no longer capable of responding to the accessory within the threshold amount of time:
comparing, by the user device, the accessory attribute information against the second information about the second hub device and third information about a third hub device;
determining, based at least in part on the comparison, whether the accessory is to connect to the second hub device or the third hub device; and
providing instructions to either the second hub device or the third hub device to connect to the accessory according to the determination.

13. The method of claim 1, further comprising:
receiving, by the user device, functionality information about the first hub device; and
determining, based at least in part on the functionality information, that the first hub device is no longer a best hub for the accessory.

14. The method of claim 13, further comprising, in accordance with the determination that the first hub device is no longer the best hub for the accessory:
comparing, by the user device, the accessory attribute information against the second information about the second hub device and third information about a third hub device;
determining, based at least in part on the comparison, whether the accessory is to connect to the second hub device or the third hub device; and
providing instructions to either the second hub device or the third hub device to connect to the accessory according to the determination.

15. A computer-readable storage medium configured to store computer-executable instructions that, when executed by a user device, cause the user device to perform operations comprising:
receiving first information about a first hub device of a plurality of hub devices configured to transmit various control instructions to an accessory and second information about a second hub device of the plurality of hub devices configured to transmit the various control instructions to the accessory;
receiving a connection request from the accessory;
receiving, from the accessory, accessory attribute information;
comparing the accessory attribute information of the accessory against the first information about the first hub device and the second information about the second hub device, the first information comprising a first number of available connection slots of the first hub device, and the second information comprising a second number of available slots of the second hub device;
determining, based at least in part on the comparison, whether the accessory is to connect to the first hub device or the second hub device; and
in accordance with a determination that the accessory is to connect to the first hub device, providing instructions to the first hub device to connect to the accessory.

16. The computer-readable storage medium of claim 15, wherein the operations further comprise:
receiving a second connection request from a second accessory;
receiving, from the second accessory, second accessory attribute information;
comparing the second accessory attribute information against the first information about the first hub device and the second information about the second hub device;
determining, based at least in part on the comparison, whether the second accessory is to connect to the first hub device or the second hub device; and
in accordance with a determination that the second accessory is to connect to the first hub device, providing additional instructions to the first hub device to connect to the second accessory.

17. A user device, comprising:
a memory configured to store computer-executable instructions; and
a processor configured to connect to the memory and execute the computer-executable instructions to at least:
receive first information about a first hub device of a plurality of hub devices configured to transmit various control instructions to an accessory and second information about a second hub device of the plurality of hub devices configured to transmit the various control instructions to the accessory;
receive a connection request from the accessory;
receive, from the accessory, accessory attribute information;
compare the accessory attribute information of the accessory against the first information about the first hub device and the second information about the second hub device, the first information comprising a first number of available connection slots of the first hub device, and the second information comprising a second number of available slots of the second hub device;

determine, based at least in part on the comparison, whether the accessory is to connect to the first hub device or the second hub device; and in accordance with a determination that the accessory is to connect to the first hub device, provide instructions to the first hub device to connect to the accessory.

18. The user device of claim 17, wherein the computer-executable instructions are further executed to at least:

receive a second connection request from a second accessory of a plurality of accessory devices comprising at least a first accessory and the second accessory;

receive, from the second accessory, second accessory attribute information;

compare the second accessory attribute information against the first information about the first hub device and the second information about the second hub device;

determine, based at least in part on the comparison, whether the second accessory is to connect to the first hub device or the second hub device; and in accordance with a determination that the second accessory is to connect to the second hub device, provide additional instructions to the second hub device to connect to the second accessory; and in accordance with a determination that the second accessory is to connect to the first hub device, providing instructions to the first hub device to connect to the second accessory.

19. The user device of claim 18, wherein the computer-executable instructions are further executed to at least:

managing, by the user device, a first state of the accessory and a second state of the second accessory, the first state identifying that the accessory is connected to the first hub device, and the second state identifying that the accessory is connected to one of the first accessory or the second accessory.

20. The user device of claim 19, wherein the computer-executable instructions are further executed to at least:

managing, by the user device, a third state of a third accessory of the plurality of accessories, the third state identifying that the third accessory is not connected to any hubs of the plurality of hub devices.

* * * * *